A. LEYER.
MIXER.
APPLICATION FILED APR. 9, 1918.

1,281,603.

Patented Oct. 15, 1918.

INVENTOR.
AMAND LEYER
BY
Carlos P. Griffin
ATTORNEY.

UNITED STATES PATENT OFFICE.

AMAND LEYER, OF SAN FRANCISCO, CALIFORNIA.

MIXER.

1,281,603.   Specification of Letters Patent.   Patented Oct. 15, 1918.

Application filed April 9, 1918. Serial No. 227,562.

*To all whom it may concern:*

Be it known that I, AMAND LEYER, a citizen of the United States, residing at San Francisco, in the county of San Francisco, State of California, have invented a new and useful Mixer, of which the following is a specification, in such full and clear terms as will enable those skilled in the art to construct and use the same.

This invention relates to a mixer used for the purpose of mixing batter, beating eggs and other analogous uses.

An object of the invention is to provide a mixer which will effectively stir and beat up the particles of the mass to be mixed without splashing the same over the top of the receptacle containing the mass.

Another object of the invention is to produce a mixer which can be used to mix very small quantities of material, the stirring device acting to lift up the material even though only a small quantity is placed in the bottom of the receptacle containing such substances.

Other objects of the invention will appear as the description proceeds.

An embodiment of the invention is shown in the drawings in which the same reference numeral is applied to the same portion throughout, but I am aware that there may be modifications thereof.

Figure 1:
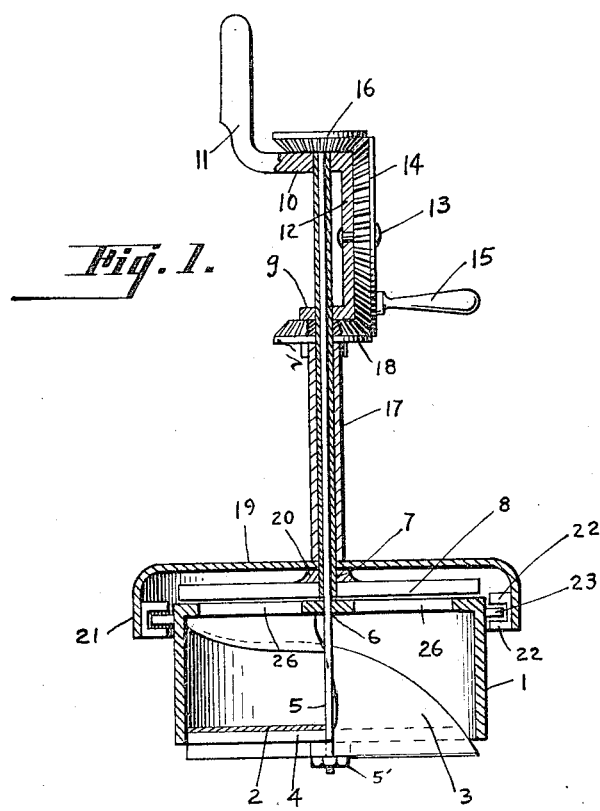
Figure 1 is a vertical sectional view of the mixer.
Figure 2:
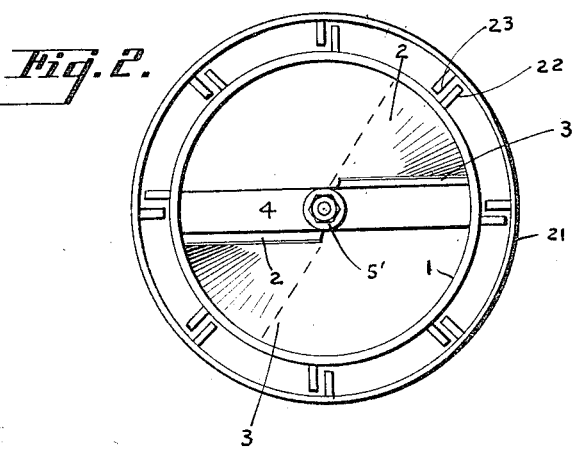
Fig. 2 is a bottom plan view of the mixer.

The mixer comprises an inverted cup like cylinder which has two spiral vanes 2 and 3 which extend somewhat below the bottom of the cylinder for the purpose of scooping up the material to be mixed.

This cylinder has a cross bar 4 upon which the vanes rest at their lower ends, and said cross bar is secured to a shaft 5 by a nut 5' which shaft is also secured to the cylinder at 6 for the purpose of rotating it.

Surrounding the shaft 5 is a tube 7 which is rigidly connected with a bar 8. The tube 7 is also rigidly connected with two horizontal members 9 and 10 which are integral with the handle 11. The member 12 connects the members 9 and 10 and furnishes a bearing for a short shaft 13 upon which the bevel wheel 14 rotates, said bevel wheel having a handle 15 to drive it. The shaft 5 has a pinion 16 connected therewith at its upper end in mesh with the bevel gear 14 and outside the tube 7 there is a tube 17 which carries a bevel gear at its upper end and which is connected with a cover 19 extending over the top of the cylinder 1. This cover rests upon a pin 20 which connects the bar 8 with the tube 7. The outer edge of the cover 19 is turned down, as indicated at 21, and extends below the top of the cylinder 1, and is provided with a plurality of inwardly projecting vanes 22 above and below a plurality of other vanes 23 carried by the cylinder 1.

The result of the foregoing construction is that as the bevel gear 14 is rotated with the handle 15, the bar 8 will remain in the same position as the handle being rigidly connected therewith, while the cylinder will rotate in one direction and scoop up any material in the receptacle in which it is placed. This material will be worked up through the openings 25, 26 in the top of the cylinder and will be scraped off by the bar 8, and as it is scraped off it will be pushed outwardly and will drop down over the edge of the cylinder and be effectively beaten by the vanes 22, 23, and since its tendency is to travel down there will be no splashing over top of the receptacle.

Having thus described my invention what I claim as new and desire to secure by Letters Patent of the United States is as follows, express reservation being made of permissible modifications.

1. A mixer comprising a hollow shell having spiral vanes therein with openings through the shell at the top of the vanes, a scraper above the shell in close proximity thereto, a cover over the shell and scraper, the edges of the cover depending below the upper edges of the shell and coöperating means carried by the shell and cover for mixing plastic or liquid materials.

2. In a mixer, a cylindrical shell having a pair of spiral vanes therein with openings through the shell at the top of the vanes, a fixed scraper in close proximity to the top of the shell, a handle connected therewith, a revoluble cover over the shell and scraper, the edges of which depend below the upper portion of the shell, inwardly projecting vanes carried by the cover, outwardly projecting vanes carried by the cylindrical shell coöperating with the latter vanes, and means to rotate the cover and shell in opposite directions whereby liquid or plastic materials will be mixed.

3. In a mixer, a hollow cylindrical shell having a pair of spiral vanes therein with openings through the shell at the top of the vanes, a fixed bar above the shell in close proximity thereto, a handle connected with said bar, a cover above the bar having depending edges which extend below the top of the shell, a plurality of vanes carried by the cover extending toward the shell, a plurality of oppositely extending vanes carried by the shell to coöperate with the latter vanes, and means to rotate the shell in one direction while the cover is rotated in the opposite direction for the purpose of mixing plastic or liquid materials.

In testimony whereof I have hereunto set my hand this 3d day of April A. D. 1918.

AMAND LEYER.

Copies of this patent may be obtained for five cents each, by addressing the "Commissioner of Patents, Washington, D. C."